US006975717B1

(12) United States Patent
Smith et al.

(10) Patent No.: US 6,975,717 B1
(45) Date of Patent: Dec. 13, 2005

(54) SELECTIVE PROCESSING OF CALLS USING ALTERNATIVE NETWORK TELEPHONY

(75) Inventors: Geoff Smith, Palo Alto, CA (US); Michael Lee, Cupertino, CA (US); Steve Young, Los Gatos, CA (US); Todd Krein, San Jose, CA (US)

(73) Assignees: Vulcan Research LLC, Palo Alto, CA (US); Digeo, Inc., Kirkland, WA (US)

( * ) Notice: Subject to any disclaimer, the term of this patent is extended or adjusted under 35 U.S.C. 154(b) by 197 days.

(21) Appl. No.: 10/388,767

(22) Filed: Mar. 13, 2003

(51) Int. Cl.[7] ............................................. H04M 7/00
(52) U.S. Cl. ........................... 379/221.01; 379/221.02; 379/272; 379/273
(58) Field of Search ........................ 379/45, 46, 114.02, 379/220.01, 221.01, 221.03, 271, 272

(56) References Cited

U.S. PATENT DOCUMENTS

| | | | | |
|---|---|---|---|---|
| 3,001,027 | A | * | 9/1961 | Armstrong et al. ............ 379/2 |
| 4,284,852 | A | * | 8/1981 | Szybicki et al. ........ 379/221.01 |
| 4,991,204 | A | * | 2/1991 | Yamamoto et al. .... 379/221.01 |
| 5,142,570 | A | * | 8/1992 | Chaudhary et al. .... 379/221.07 |
| 5,675,577 | A | * | 10/1997 | Komatsu .................... 370/237 |
| 5,793,859 | A | * | 8/1998 | Matthews .............. 379/211.03 |
| 6,009,163 | A | * | 12/1999 | Nabkel et al. .......... 379/266.01 |
| 6,377,677 | B1 | * | 4/2002 | Ackerley et al. ........... 379/279 |
| 6,480,595 | B1 | * | 11/2002 | Hamano ..................... 379/225 |
| 6,567,514 | B2 | * | 5/2003 | Fleischer et al. ...... 379/221.03 |
| 6,721,395 | B2 | * | 4/2004 | Martinez ..................... 379/45 |

FOREIGN PATENT DOCUMENTS

EP     0 584 918 A1 *  3/1994    ............. H04L 1/22

OTHER PUBLICATIONS

Anon, 2 Wire, Inc., various pages from website http://www.2wire.com/home/adap_fil.html.
Frank, Edward H. and Holloway, Jack, "Connecting the Home with a Phone Line Network Chip Set", IEEE Micro, Mar.-Apr. 2000.
Kistner, Toni, "An energized HomePNA touts telephony", NetworkWorld Fusion, http://www.nwfusion.com/cgi-bin/mailto/x.cgi.
Teliann Telimax 200 Data Sheet "last modified" Jun. 25, 2002.
Teliann Telimax 200 Data Sheet "last modified" Nov. 2, 2002.

* cited by examiner

*Primary Examiner*—Bing Q. Bui
(74) *Attorney, Agent, or Firm*—Van Pelt, Yi & James LLP

(57) ABSTRACT

A system and method are disclosed for selective processing of calls using alternative network telephony. Called party data is received indicating a destination to which a calling party using a local telephone equipment desires to place a call. It is determined transparently to the calling party whether the called party data satisfies a first criteria for completing calls via alternative network telephony. The call is completed using alternative network telephony if it is determined that the called party data satisfies the first criteria. The call is completed via the public switched telephone network (PSTN) if it is determined that the called party data does not satisfy the first criteria.

6 Claims, 7 Drawing Sheets

SELECTIVE PROCESSING OF CALLS USING ALTERNATIVE NETWORK TELEPHONY

CROSS REFERENCE TO RELATED APPLICATIONS

This application is related to co-pending U.S. patent application Ser. No. 10/389,277 entitled FAILSAFE CONFIGURATION FOR ALTERNATIVE NETWORK TELEPHONY filed Mar. 13, 2003, which is incorporated herein by reference for all purposes; and co-pending U.S. patent application Ser. No. 10/388,605 entitled PROVIDING MULTIPLE LINE FUNCTIONALITY USING ALTERNATIVE NETWORK TELEPHONY filed Mar. 13, 2003, which is incorporated herein by reference for all purposes.

FIELD OF THE INVENTION

The present invention relates generally to alternative network telephony. More specifically, selective processing of calls using alternative network telephony is disclosed.

BACKGROUND OF THE INVENTION

In recent years alternative network telephony, using a network other than the public switched telephone network (PSTN) to enable two or more parties to carry on a conversation in real time, has become increasingly popular. The advent of high-speed access to networks, such as the Internet, has further fueled this trend. Telephone functionality has been provided using personal computers (PC's) or computer workstations connected via the Internet and/or other networks, often through high-speed connections such as cable modems or digital subscriber line (DSL) connections. Telephone functionality has also been provided via cable television networks through television set top boxes, for example.

In many cases, a packet switched network protocol, such as the Internet protocol (IP) is used to provide alternative network telephony (e.g., IP telephony). Under such a protocol, the analog audio signal generated by a speaking call participant is digitized and sent via the alternative network from the sending station to the receiving station(s) in one or more data packets conforming to the applicable protocol. At the receiving end, the data typically is reassembled, if necessary, and converted back to an analog audio signal. The data is then typically delivered to the recipient via an audio output device, such as one or more speakers, a headset, or a telephone handset or other output device.

It would be desirable for cable television service providers, providers of interactive television services and/or equipment, and/or other providers or potential providers of alternative network telephony equipment and services to have a way to compete effectively with more traditional providers of long distance and/or local telephone service. Such competition may bring lower prices, better and expanded service, and more choice to consumers.

One potential obstacle to such competition is the fact that the provision of telephone service is highly regulated. For example, regulations impose certain requirements relating to "911" access to emergency services. In many cases, for example, caller identification (caller ID) functionality must be provided to enable an emergency dispatcher to whom a 911 call has been routed to determine the number from which a call was placed, and in some cases the name and/or address associated with that number. Federal, state, and local laws and regulations may impose other requirements for such calls. Satisfying such requirements for 911 calls may add unwanted complexity and cost to relying solely on alternative network telephony services for such calls.

In addition, in some cases it may be advantageous to process certain other types of calls as normal calls over the PSTN, instead of as alternative network telephony calls. For example, if a consumer contracts for local telephone service with a local telephone service provider on a flat fee for unlimited local calls, it may be desirable to process such local calls over the PSTN, rather than potentially occurring additional charges for access to and/or needlessly putting traffic on the alternative network.

Therefore, there is a need for a way to provide telephone services to consumers of such services via alternative network telephony in such a way that certain calls more advantageously processed via the PSTN may be processed automatically in that manner, while other calls are processed using alternative network telephony.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Selective processing of calls using alternative network telephony is disclosed. A user dials a number on a telephone handset or other device. Transparently to the user, a call processing system determines whether the dialed number is one that should be processed via the PSTN or instead is one that should be processed using alternative network telephony. If the call is to be processed as a PSTN call, the call processing system places the call via the PSTN, acting as a "proxy" for the user. The call processing system relays transmissions to and from the telephone handset and the PSTN, as required. If the call is to be process using alternative network telephony, the call processing system processes the call as an alternative network telephony call.

Figure 1:
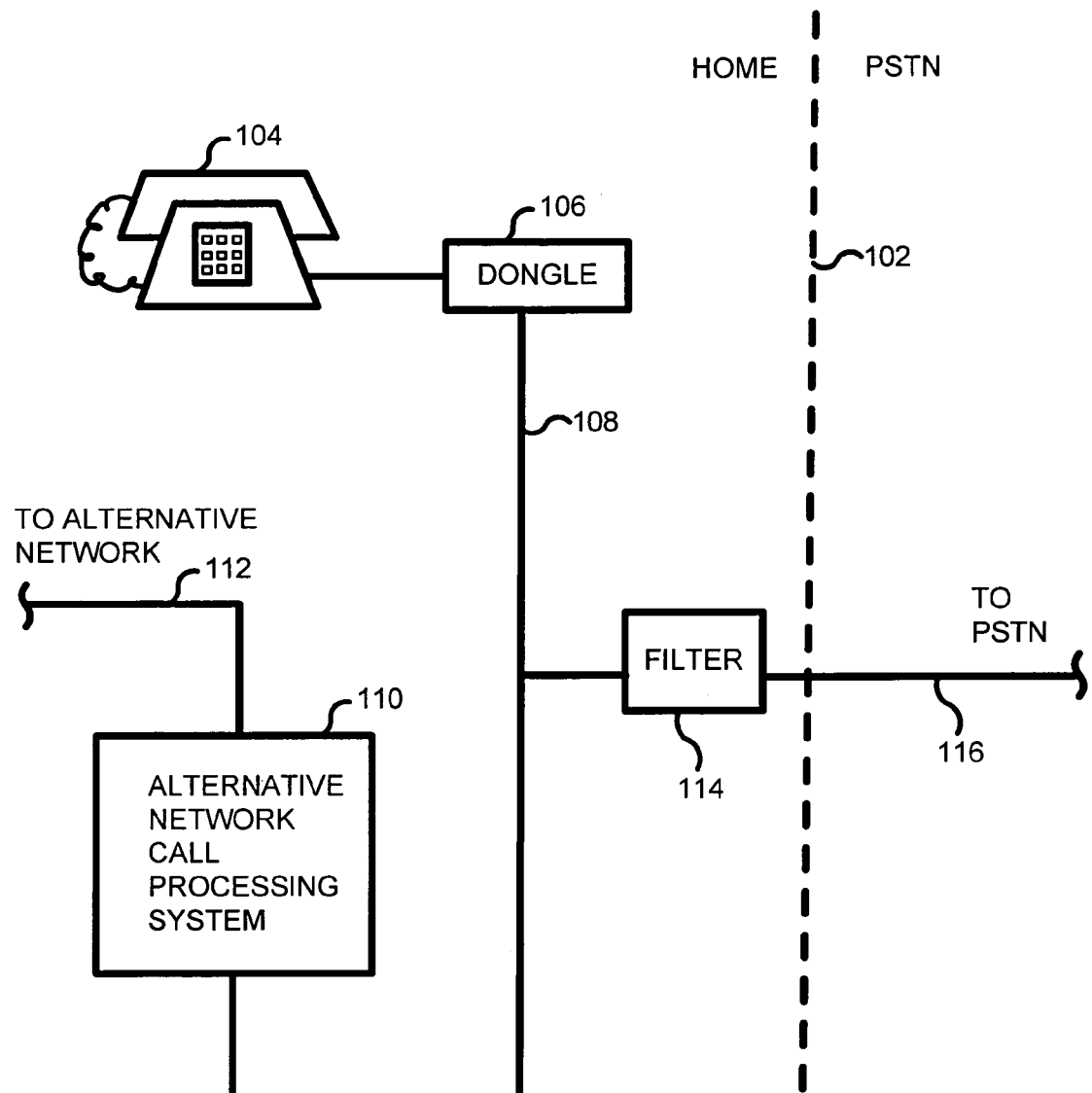
FIG. 1 is a schematic diagram of system used in one embodiment to process calls selectively using alternative network telephony.

FIG. 1 is a schematic diagram of system used in one embodiment to process calls selectively using alternative network telephony. A schematic representation of a boundary 102 between the home telephone wiring and the public switched telephone network is shown in FIG. 1. While the location of the telephone is shown in FIG. 1 as being a home, the telephone may be in any location equipped to complete calls through alternative network telephony and having a connection to the PSTN. In the home, a telephone handset 104 is connected via a dongle 106 to the internal telephone wiring 108. In one embodiment, the dongle 106 is connected by plugging the dongle into the telephone handset 104 and then connecting the dongle 106 to a telephone wiring jack via a connection cable. While a telephone handset 104 is shown in FIG. 1, and equipment configured to place and/or receive telephone calls may be used.

An alternative network call processing system 110 also is connected to the internal telephone wiring 108. The alternative network call processing system 110 is used to process telephone calls over an alternative network, as described more fully below. The alternative network call processing system 110 is connected to an alternative network, such as the Internet, via an alternative network connection 112. In one embodiment, the alternative network call processing system 110 is connected to the alternative network via a cable modem connected to a cable television system connection at the home. However, any suitable connection to the alternative network may be used. A filter 114 is interposed at the boundary 102 between the in home internal telephone wiring 108 and the external wiring connection 116 to the PSTN. As described more fully below, the filter 114 is used to prevent undesired interaction between the internal telephone system in the home and the PSTN when an alternative network call is being processed in the home. In one embodiment, the dongle 106 includes a frequency shifter used to shift the frequency of the audio signal received from the telephone handset 104 by a prescribed amount. In one embodiment, the audio signal is shifted by a prescribed amount on the order of 100 to 300 megahertz (MHz). In one embodiment, the filter 114 is configured such that signals shifted in frequency by the dongle 106 as described above would not pass through the filter 114 to the PSTN. In one embodiment, the filter 114 comprises a notch filter selected and configured such that the filter 114 will allow to pass in both directions all signals except those within a defined frequency band centered on the amount of frequency shift applied to the audio signal by dongle 106 as described above. As a result, audio signals shifted in frequency by operation of the dongle 106 do not pass through the filter 114 and are not passed either from the home to the PSTN or from the PSTN to the home.

As described more fully below, the alternative network call processing system 110 is configured to receive the frequency shifted signal output by the dongle 106 and to downshift the signal to the original frequency range. The call processing system 110 then processes the outgoing audio data for transmission in the manner well known in the art of alternative network telephony. Similarly, as described more fully below, audio data received by the call processing system 110 via the alternative network connection 112 is frequency shifted by the call processing system 110 by the same amount that the dongle 106 frequency shifts outgoing audio signals. The frequency-shifted signal is then provided to the internal telephone wiring 108. The frequency-shifted signal is received by the dongle 106 and downshifted to the normal voice audio frequency range, after which it is provided to the handset 104. In one embodiment, the alternative network call processing system 110 is configured to ignore signals on internal telephone wiring 108 in the normal voice audio frequency range that have not been frequency shifted out of that range. In one embodiment, as discussed more fully below, the alternative network call processing system 110 is so configured so as to permit un-shifted voice signals to be processed normally over the PSTN.

Figure 2:
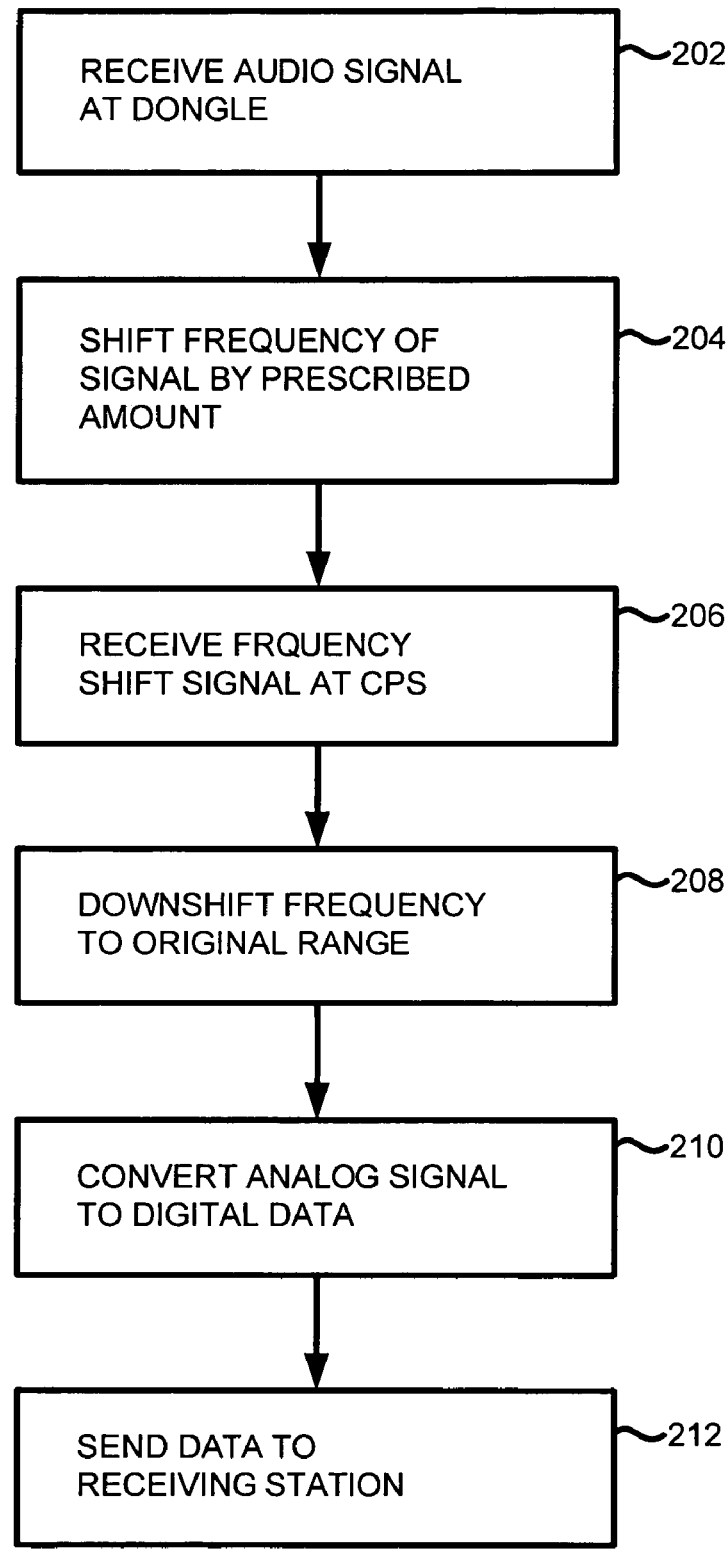
FIG. 2 is a flowchart illustrating a process used in one embodiment to process an outgoing audio signal during an alternative network telephony call, such as when a user speaks into the handset 104 of FIG. 1 during an alternative network telephony call.

FIG. 2 is a flowchart illustrating a process used in one embodiment to process an outgoing audio signal during an alternative network telephony call, such as when a user speaks into the handset 104 of FIG. 1 during an alternative network telephony call. In step 202, the audio signal output by the handset 104 is received at the dongle 106. In step 204, the dongle shifts the frequency of the audio signal by a prescribed amount and outputs the frequency-shifted audio signal to the internal telephone wiring 108. In step 206, the frequency-shifted signal is received at the call processing system 110. In step 208, the frequency-shifted signal is downshifted to the original frequency range of the audio signal output by the handset 104. In step 210, the analog audio signal is converted to digital audio data. Finally, in step 212, the digital audio data is sent to the receiving station via alternative network telephony, such as by Internet protocol (IP) telephony.

Figure 3:
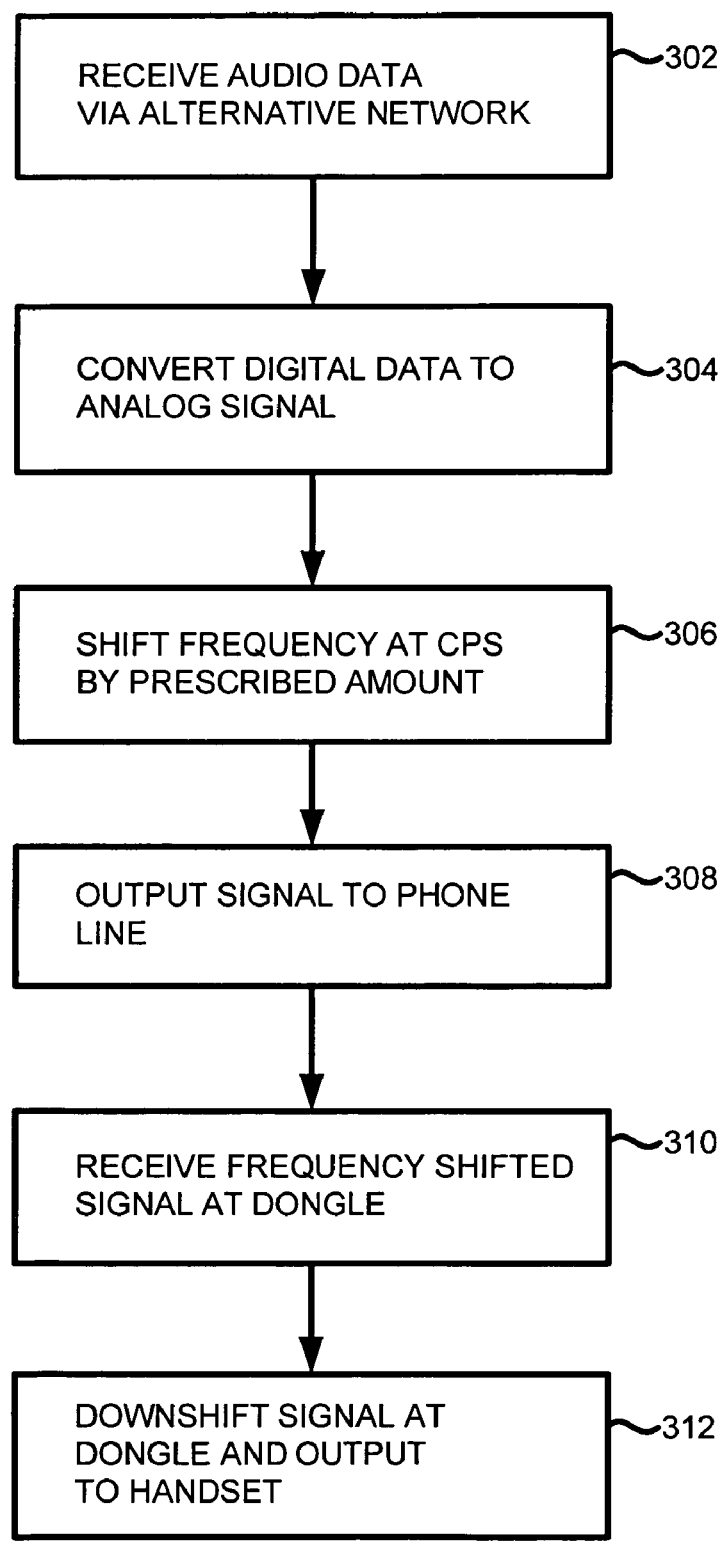
FIG. 3 is a flow chart illustrating a process used in one embodiment to process incoming audio data during an alternative network telephony call, such as occurs when a remote participant has spoken during the call and the audio data so generated has been sent in digital form via the alternative network and received by the call processing system 110 via the alternative network connection 112.

FIG. 3 is a flow chart illustrating a process used in one embodiment to process incoming audio data during an alternative network telephony call, such as occurs when a remote participant has spoken during the call and the audio data so generated has been sent in digital form via the alternative network and received by the call processing system 110 via the alternative network connection 112. In step 302, the audio data is received by the call processing system 110 via the alternative network. In step 304, the call processing system 110 converts the digital audio data received to an analog audio signal. In step 306, the call processing system 110 shifts the analog audio signal in frequency by a prescribed amount. In one embodiment, the magnitude of the frequency shift for incoming audio data is the same as the frequency shift applied by the dongle 106 to outgoing audio data. In step 308, the call processing system outputs the frequency-shifted audio signal to the internal telephone wiring 108. In step 310, the frequency-shifted audio signal is received at the dongle 106. In step 312, the frequency-shifted audio signal is down shifted in frequency by the dongle 106 and is provided as output to the handset 104.

As noted above, during the processing of outgoing and incoming audio data during an alternative network telephony call as described and illustrated in FIGS. 2 and 3, the filter 114 of the system shown in FIG. 1 operates to prevent any of the frequency shifted audio signal data from passing to the PSTN. In this manner, the PSTN system and equipment do not perceive any activity on the internal telephone wiring 108 and, as a result, the processing of the alternative network telephony call does not interfere with the PSTN and the PSTN is not prompted or caused to interfere in any way with the processing of the alternative network telephony call.

In one embodiment, in order to ensure that telephone service remains available via the PSTN at times when the alternative network call processing system is not available, the dongle 106 may be equipped with a switch that enables the dongle to connect the telephone handset 104 to the internal telephone wiring 108 through a frequency shifter during times when the alternative network call processing system is available; or instead to bypass and connect the telephone handset 104 directly to the internal telephone wiring 108, so that calls may be completed without frequency shifting via the PSTN, during times when the alternative network call processing system is not available.

Figure 4:
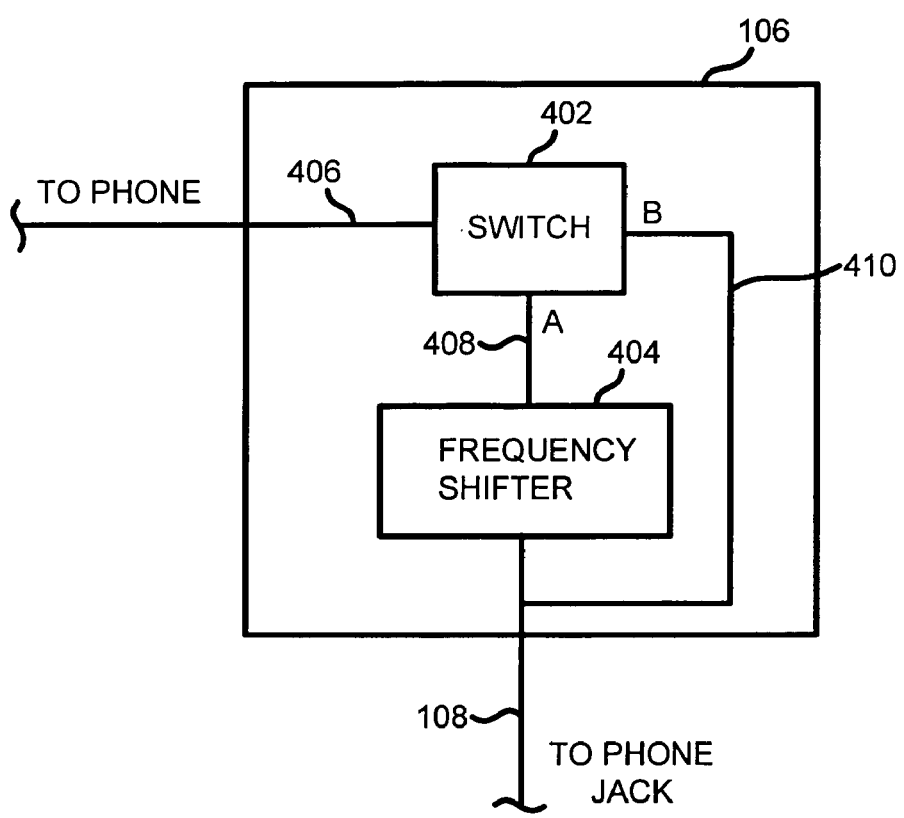
FIG. 4 shows the dongle 106 of FIG. 1 comprising a switch 402 and a frequency shifter 404.

FIG. 4 shows the dongle 106 of FIG. 1 comprising a switch 402 and a frequency shifter 404. The switch 402 is shown as having two positions. In a first position, marked "A" in FIG. 4, the line 406 connected to the telephone handset 104 is connected to the frequency shifter 404 via a line 408. When the switch 402 is in position "A", the telephone handset is connected via line 406, switch 402, and line 408 to the frequency shifter 404, and from there to the internal telephone wiring 108. In a second position, marked "B" in FIG. 4, the telephone handset 104 is connected via line 406 and switch 402 to a bypass line 410, which bypasses the frequency shifter 404 and connects the telephone handset 104 directly to the internal telephone wiring 108, without first passing through the frequency shifter 404. In one embodiment, the switch 402 is in position "A" whenever the alternative network call processing system 110 is available. In one embodiment, if the alternative network call processing system 110 is not available, the switch 402 automatically shifts to the position "B" and the frequency shifter within the dongle 106 is bypassed, permitting telephone calls to be completed via the PSTN in the normal manner, instead of being processed as alternative network telephony calls. If the frequency shifter within the dongle is bypassed, the filter 114 will not block the signal from the telephone handset 104 to the PSTN and the PSTN will respond in the normal manner to process any call placed using the handset 104. In one alternative embodiment, no switch is included in the dongle and all signals to or from the telephone handset 104 are frequency shifted, unless the dongle is removed.

Figure 5:
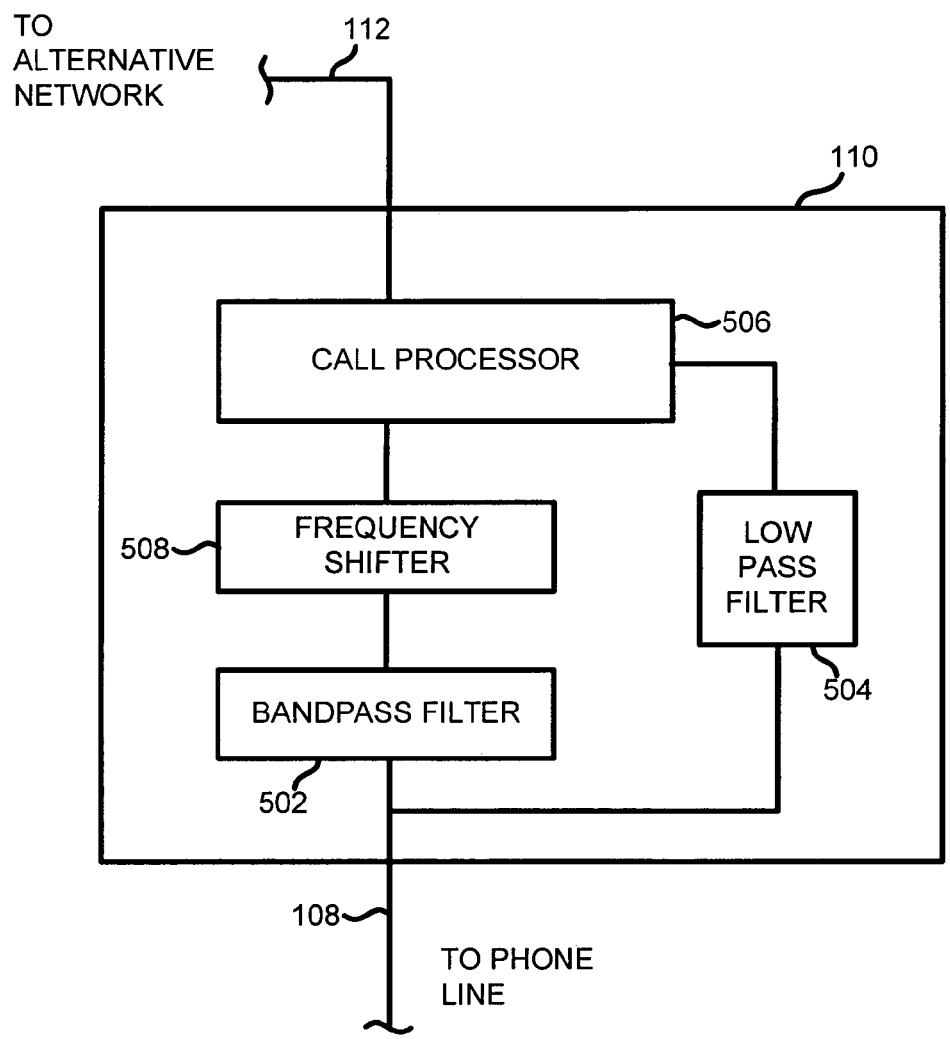
FIG. 5 shows the alternative network call processing system 110 connected via a first connection to the internal telephone wiring 108 and connected via alternative network connection 112 to the alternative network.

FIG. 5 shows the alternative network call processing system 110 connected via a first connection to the internal telephone wiring 108 and connected via alternative network connection 112 to the alternative network. In the embodiment shown in FIG. 5, the line connected to the internal telephone wiring 108 is connected to a band pass filter 502 and a low pass filter 504. In one embodiment, audio signals on the internal telephone wiring 108 that have not been frequency shifted pass through the low pass filter 504 to the call processor 506 so that such signals may be received and processed by the call processor without being downshifted. In one embodiment, such a connection may be useful to allow for the processing of calls via the PSTN, if desired, during times when the switch in dongle 106 is in the position for processing calls via the alternative network, as described more fully below.

Band pass filter 502 is configured such that only signals in the frequency range of the frequency shifted signal output by dongle 106 pass through the band pass filter 502 to the call processing system frequency shifter 508. The call processing frequency shifter 508 receives frequency-shifted outgoing audio signals from the internal telephone wiring 108 via the band pass filter 502, downshifts such signals, and outputs them to the call processor 506 for processing and transmission via the alternative network 112 in the manner well known in the art of alternative network telephony. Likewise, as described above in connection with FIG. 3, alternative network call data received via the alternative network connection 112 enters the call processing system 110 via the call processor 506 where it is reassembled, if necessary, and converted to an analog audio signal that is output to the frequency shifter 508, where it is shifted in frequency and output via the band pass filter 502 to the internal telephone wiring 108. The frequency-shifted signal output from the call processing system 110 as described is at a frequency that does not pass through the low pass filter 504. Therefore, the signal does not re-enter the call processor 506 via the low pass filter 504.

As noted above, it may be desirable to complete certain calls via the PSTN, instead of via alternative network telephony, even at times when the alternative network telephony call processing system is available. For example, to avoid having to comply with regulatory requirements for emergency "9-1-1" service, it may be desirable to complete such calls via the PSTN and leave it to the local telephone service provider to comply with any applicable regulatory requirements. Likewise, it may be desirable to complete via the PSTN calls for which there would be no (or no additional) toll for completing the call via the PSTN, or calls to certain telephone numbers or geographical regions selected based on other criteria.

In order to provide for such selective use of alternative network telephony to complete calls, in one embodiment the call processor, such as call processor 506 of FIG. 5, is equipped with logic to determine which calls should be completed via alternative network telephony and which calls should instead be completed via the PSTN.

Figure 6:
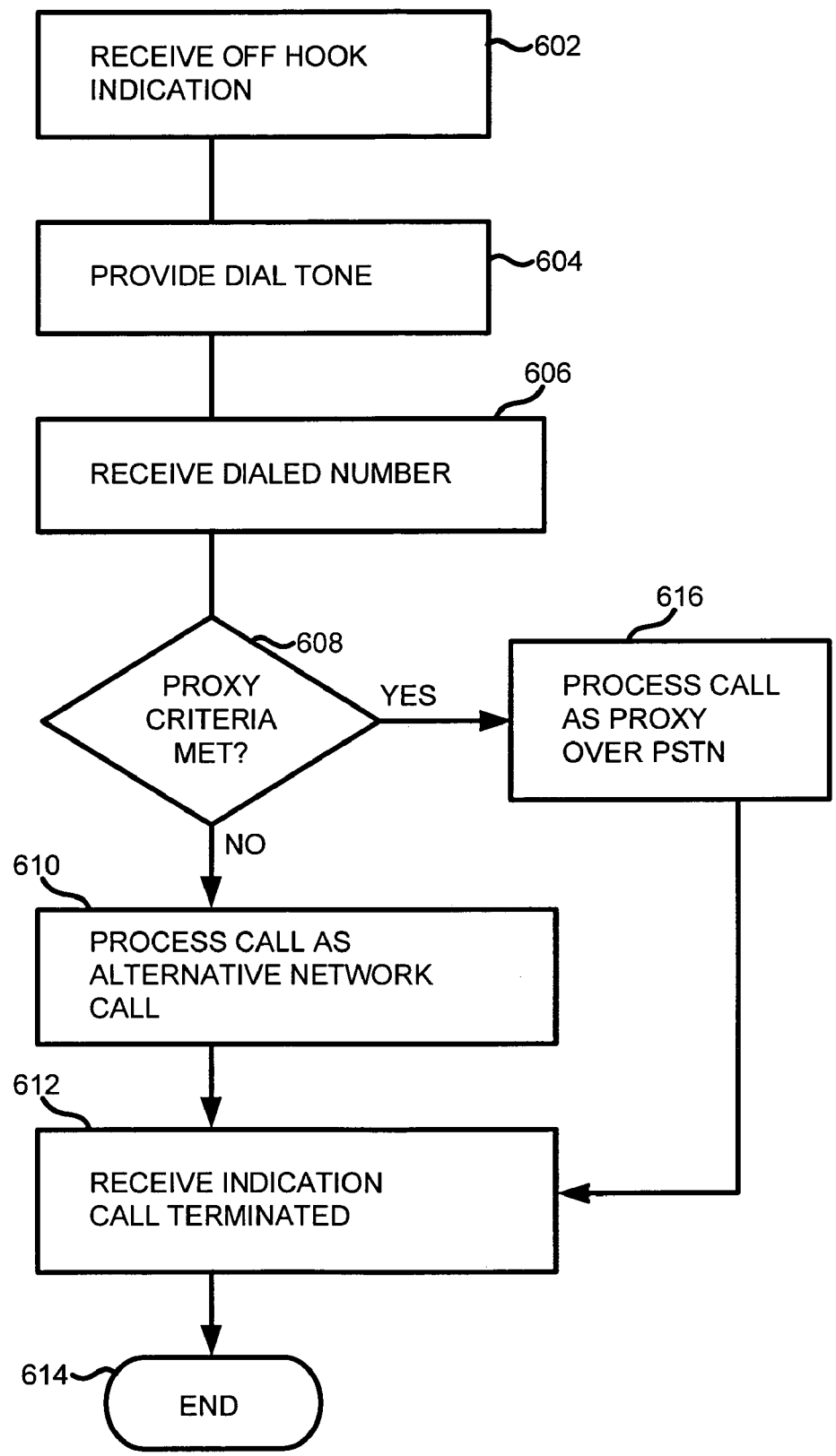
FIG. 6 is a flowchart illustrating a process used in one embodiment to determine whether or not a particular call should be processed via alternative network telephony or instead should be processed via the PSTN.

FIG. 6 is a flowchart illustrating a process used in one embodiment to determine whether or not a particular call should be processed via alternative network telephony or instead should be processed via the PSTN. In one embodiment, the process shown in FIG. 6 is implemented as logic associated with the call processor, such as call processor 506 of FIG. 5. In step 602 of the process shown in FIG. 6, the call processing system receives the "off hook" indication via the internal telephone wiring 108, indicating that the receiver has been picked up on the telephone handset 104. In step 604, the call processing system provides a frequency shifted dial tone to the internal telephone wiring 108. The dial tone is then downshifted by the dongle 106 and provided to the telephone handset 104 as a normal dial tone. In step 606, the call processing system 110 receives the digits of the number dialed by the user at the handset 104. In step 608, the call processing system determines based on the dialed number whether the call being placed should be completed via alternative network telephony or instead should be completed via the PSTN. As described more fully below, the mode in which the call processing system completes a dialed call via the PSTN is referred to herein as the "proxy" mode, because the call processing system operates as a proxy for the telephone handset and places the call on behalf of the user via the PSTN, relaying all information between the call processing system and the telephone handset in the manner described above for alternative network telephony. In one embodiment, in step 608 the criteria for determining whether a call should be completed via the PSTN in the proxy mode comprises determining whether the dialed number was "9-1-1". In one embodiment, the proxy criteria evaluated in step 608 comprises determining whether a call may be placed to the dialed number via the PSTN with no toll or charge, or with no additional toll or charge.

If it is determined in step 608 that the call to the dialed number should be completed via alternative network telephony, i.e., that the criteria for processing the call as a proxy via the PSTN has not been met, the process proceeds to step 610 in which the call is processed as an alternative network call, as described above, e.g., with respect to FIGS. 2 and 3. The system then continues to process the call until in step 612 an indication is received that the call has been terminated by one participant or the other, in which case the process ends in step 614. If in step 608 it is determined that the proxy criteria have been met, i.e., that the call to the dialed number should be completed via the PSTN, the process proceeds to step 616 in which the call is processed by the call processing system over the PSTN as a proxy on behalf of the caller using the telephone handset 104. For such a proxied call, the call processing system continues to process the call over the PSTN until in step 612 an indication is received that the call has been terminated by one participant or the other, in which case the call ends in step 614.

Figure 7:
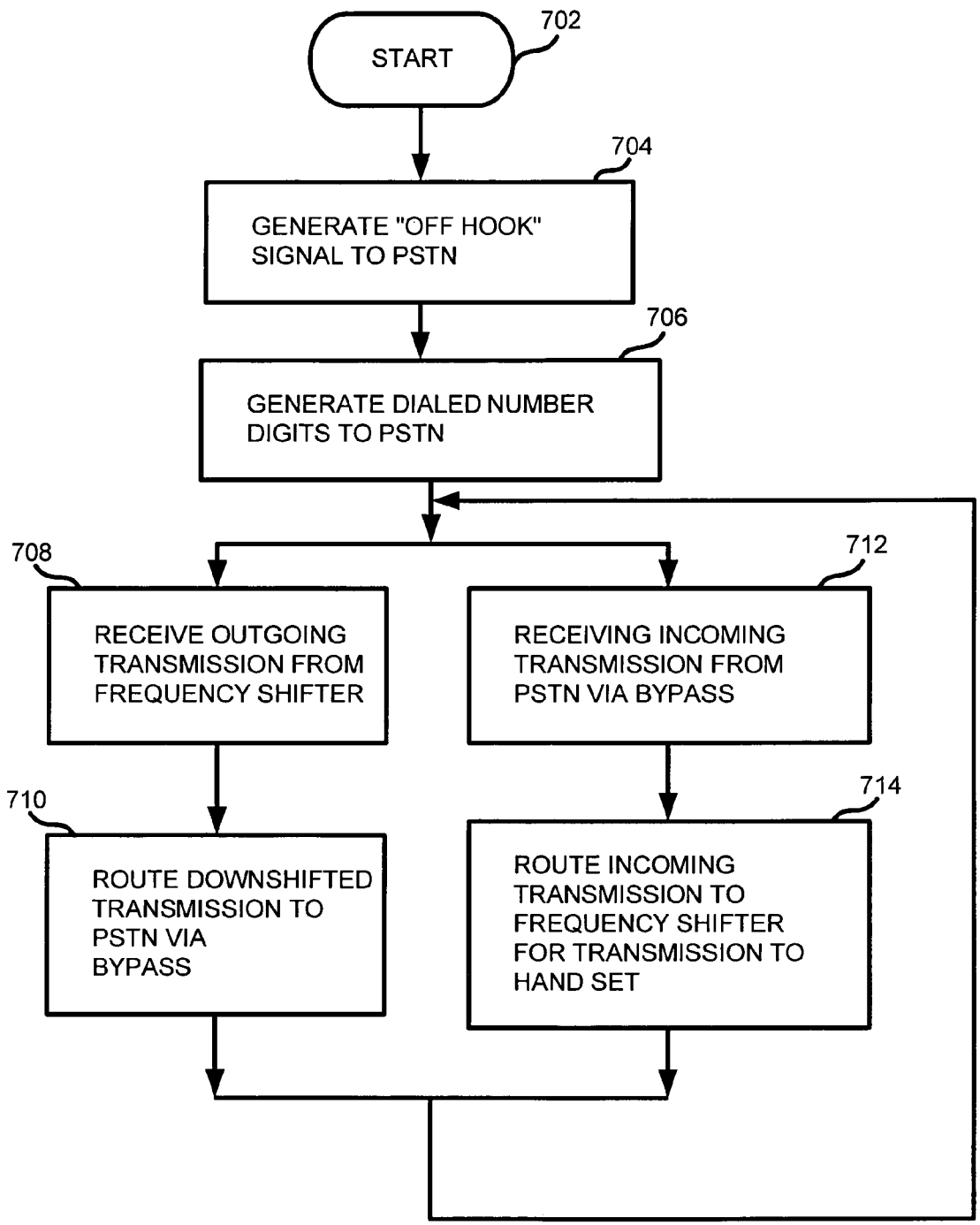
FIG. 7 is a flow chart illustrating a process used in one embodiment by the alternative network call processing system to complete a call via the PSTN in a proxy mode, such as in step 616 of FIG. 6.

FIG. 7 is a flow chart illustrating a process used in one embodiment by the alternative network call processing system to complete a call via the PSTN in a proxy mode, such as in step 616 of FIG. 6. The process starts in step 702 and proceeds to step 704, in which the call processing system generates the "off hook" signal to the PSTN. In order to send the "off hook" signal to the PSTN, the call processing system must send the signal in the non-frequency-shifted mode, so that the signal will pass through the filter 114. Referring briefly to FIG. 5, in order to pass the "off hook" signal to the PSTN in the non-frequency-shifted mode, in one embodiment the call processor 506 outputs the "off hook" signal via the line connected to low pass filter 504, which passes the non-frequency-shifted signal to the internal telephone wiring 108 (bypassing the frequency shifter), from which it passes via filter 114 and connection 116 to the PSTN. In one embodiment, in step 704 the call processing system then waits until it receives, via the low pass filter 504, the non-frequency-shifted dial tone signal from the PSTN. In step 706, the call processing system generates the digits of the dialed number to the PSTN, once again without applying any frequency shift to the respective tones associated with the dialed digits as they are generated. Once the dialed number digits have been generated to the PSTN, the PSTN will connect the call to the station associated with the dialed number, and audio signals may then be sent between the call processing system and the station associated with the dialed number via the PSTN.

Steps 708 and 710 of the process shown in FIG. 7 relate to the transmission of audio signals originating from the participant using the telephone handset 104, i.e. outgoing audio signals. As described above, when a user speaks into the telephone handset 104, the dongle 106 applies a frequency shift and places the frequency-shifted version of the audio signal on the internal telephone wiring 108. This frequency-shifted signal does not pass through the filter 114 and is instead provided to the alternative network call processing system 110. In one embodiment, referring to FIG. 5, the received audio signal passes through the band pass filter 502 but will not pass through the low pass filter 504, because the frequency is too high. From the band pass filter 502, the audio signal passes through the frequency shifter 508, where it is downshifted and provided to the call processor 506 via the connection between the frequency shifter 508 and the call processor 506. In one embodiment, the call processor recognizes by the line on which a signal has been received that it has been received via the frequency shifter 508. Referring further to FIG. 7, in step 708 the call processor receives the downshifted outgoing audio signal via the frequency shifter. In step 710, the downshifted audio signal received from the frequency shifter is transmitted to the PSTN by outputting the signal via the low pass filter 504 back to the internal telephone wiring 108 as a non-frequency-shifted audio signal. The non-frequency-shifted audio signal then passes through filter 114 to the PSTN via connection 116 and is processed and routed via the PSTN to the other call participant in the normal manner for calls placed via the PSTN. In one embodiment, the dongle comprises a notch filter, or other appropriate filter, to block the non-frequency-shifted audio signal placed on the internal wiring 108 by the call processing system 110 from passing through the dongle to the telephone handset 104. In one embodiment, no such filter is required because the telephone handset 104 is configured to ignore any signals that are downshifted by the frequency shifter in the dongle into a frequency range that is below the normal audio range for normal telephonic voice communications.

Steps 712 and 714 of the process shown in FIG. 7 relate to the processing of incoming audio signals received via the PSTN by the call processing system as part of a proxied call. In step 712, the call processing system receives via the internal telephone wiring 108 a non-frequency-shifted audio signal. In one embodiment, referring briefly to FIG. 5, the call processor 506 determines that the transmission was received as a non-frequency-shifted audio signal via the PSTN because the signal passes to the call processor 506 via the low pass filter 504 instead of passing through the band pass filter 502 and the frequency shifter 508. This would occur because the band pass filter 502 would block a non-frequency-shifted audio signal received over the PSTN, while the low pass filter 504 would permit the signal to pass to the call processor 506 via the connection between the low pass filter 504 to the call processor 506. In step 714, the call processor 506 routes the non-frequency-shifted audio signal received via the PSTN out through the frequency shifter, such as frequency shifter 508 of FIG. 5, and through the associated band pass filter 502, to the internal telephone wiring 108. The frequency-shifted signal then is passed via the dongle 106, where it is downshifted in frequency, to the telephone handset 104. The steps 708 and 710 for outgoing audio signals, and/or the steps 712 and 714 for received audio signals, are then repeated as necessary as the respective participants to the call speak, until an indication is received that the call has been terminated, as in step 612 of the process shown in FIG. 6.

As described above, therefore, the alternative network call processing system 110 serves as a proxy for the telephone handset 104 in completing the call over the PSTN. During such a proxied call, the handset 104, dongle 106, and the frequency shifter and associated filter within the call processing system all operate as they would for a call being processed as an alternative network telephony call, with respect to audio signals passed back and forth between the handset 104 and the alternative network call processing system. The call processing system, however, completes the call to the destination party via the PSTN, instead of completing the call via the alternative network, and relays audio signals between the telephone handset 104 and the other participant via the PSTN instead of doing so via the alternative network. In this way, no charges are incurred for completing the call via alternative network telephony and the alternative network call processing system is not required to duplicate or comply with any regulatory requirements that the PSTN may already be required and configured to comply with, such as providing caller identification, user identification, and/or address information for a call to the emergency 911 service.

While one or more embodiments described in detail herein may employ frequency shifting, the present disclosure contemplates and encompasses approaches in which other encoding techniques are used. The only requirement is that the alternative network call processing system must be able to distinguish between signals on the internal telephone wiring, such as internal telephone wiring 108 of FIG. 1, that are in the normal voice range, which are meant to be processed normally over the PSTN, and specially encoded signals which are meant to be processed not by the PSTN but instead by the alternative network call processing system. For example, and without limitation, any suitable type of frequency encoding may be used. In one embodiment, instead of using frequency shifting as described above an incoming or outgoing audio signal may be used to frequency modulate one or more carrier waves having a frequency outside the normal frequency range of a voice signal. In one such embodiment, frequency filters may be used to permit applicable components to either operate on, or ignore, a signal depending on the carrier frequency used, in a manner similar to the frequency shifting approach described above. In one embodiment, in the system of FIG. 1 the dongle 106 is configured to encode and decode voice signals originated by and destined for the handset 104, respectively, in accordance with the encoding method the remaining system components, such as alternative network call processing system 110, are configured to use. For example, in one embodiment where frequency modulation encoding is used, the dongle 106 is configured to use a voice range audio signal generated by handset 104 to modulate a carrier frequency sufficiently outside the normal voice range to enable the relevant remaining components to distinguish such an encoded signal from an unencoded a voice range audio signal. In one embodiment, the dongle 106 is configured to receive a signal encoded using frequency modulation of a carrier signal having a frequency outside the normal voice range, demodulate the signal, and present the decoded original signal as audio output on handset 104.

While processing of calls comprising voice audio signals is described above, the approach described herein may as well be used to handle other types of audio signals. In such other cases, the frequency shift, carrier frequency, or other encoding parameter, as appropriate, is selected so as to ensure that the relevant system components can distinguish between and encoded signal and one that has not been encoded. As used herein, the term "encoding" means transforming the signal into a form so that system components may be configured to distinguish between the encoded signal and a signal that has not been encoded, such as by, without limitation, adjusting, modifying, or transforming the signal, combining the signal with another signal, using the signal to modulate another signal or carrier wave, etc.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system for selective processing of calls using alternative network telephony for a telephone equipment associated with local telephone wiring, comprising:

an alternative network telephony call processing system having a first connection to the local telephone wiring and a second connection to an alternative network, the call processing system comprising a processor configured to:

receive called party data indicating a destination to which a calling party using a local telephone equipment desires to place a call;

determine transparently to the calling party whether the called party data satisfies a first criteria for completing calls via alternative network telephony;

complete the call via the alternative network using alternative network telephony if it is determined that the called party data satisfies said first criteria; and complete the call via the public switched telephone network (PSTN) if it is determined that the called party data does not satisfy said first criteria;

whereby the call is completed either using alternative network telephony or via the PSTN automatically and transparently to the calling party depending on whether or not the called party data satisfies said first criteria; and a connector interposed between the telephone equipment and the local telephone wiring, the connector being configured to modify outgoing audio data received from the telephone equipment and provide the modified outgoing audio data to the local telephone wiring;

wherein the alternative network call processing system is configured to receive modified outgoing audio data via the local telephone wiring, restore the modified outgoing audio data to its original form, and send the restored outgoing audio data to the destination via alternative network telephony in the case of a call to be completed via alternative network telephony and via the PSTN in the case of a call to be completed via the PSTN.

2. The system of claim 1, wherein the connector comprises a connector frequency shifter configured to modify outgoing audio data by shifting outgoing audio data in frequency by a first frequency shift.

3. The system of claim 2, further comprising a filter interposed between the local telephone wiring and the PSTN, the filter being configured to prevent frequency shifted audio data from being passed to the PSTN.

4. The system of claim 2, wherein the alternative network telephony call processing system further comprises a call processing system frequency shifter configured to downshift frequency shifted outgoing audio received via the local telephone wiring by the first frequency shift.

5. The system of claim 1, wherein the alternative network call processing system is further configured to:
receive incoming audio data from the destination;
modify the incoming audio data; and
provide the modified incoming audio data to the local telephone wiring; and
wherein the connector is further configured to receive modified incoming audio data via the local telephone wiring, restore the modified incoming audio data to its original form, and provide the restored incoming audio data to the telephone equipment.

6. The system of claim 5, wherein:
the incoming audio data is received via the alternative network using alternative network telephony in the case of a call completed using alternative network telephony; and
the incoming audio data is received via the PSTN in the case of a call completed via the PSTN.

* * * * *